W. D. MOODY.
GREEN FOOD FEEDER FOR POULTRY.
APPLICATION FILED OCT. 23, 1912.

1,084,584.

Patented Jan. 13, 1914.

UNITED STATES PATENT OFFICE.

WILLIAM D. MOODY, OF FREEPORT, MAINE, ASSIGNOR TO HUBERT F. PIERCE, OF NEW YORK, N. Y.

GREEN-FOOD FEEDER FOR POULTRY.

1,084,584. Specification of Letters Patent. Patented Jan. 13, 1914.

Application filed October 23, 1912. Serial No. 727,371.

*To all whom it may concern:*

Be it known that I, WILLIAM D. MOODY, a citizen of the United States, residing at Freeport, county of Cumberland, State of Maine, have invented certain new and useful Improvements in Green-Food Feeders for Poultry, of which the following is a specification.

This invention relates to feeding devices for poultry and the like, and particularly to a device for feeding green food such as raw vegetables, clover and like food, to poultry. As is well known in the industry of raising fowls, it is particularly difficult to supply vegetable diet to poultry in a satisfactory condition. This is due to the fact that the vegetable food is subject to very rapid deterioration if not protected against the usual trampling and soiling of the poultry yard.

It is the object of my invention, therefore, to provide means by which vegetables may be rendered readily accessible to the fowl without permitting the loss and general waste to which such food is particularly liable.

The construction and operation of my device will be more fully described in the specification which follows.

In the drawings which form a part of that specification, I have shown my device in a form which I have found well adapted to practical use.

Figure 1:
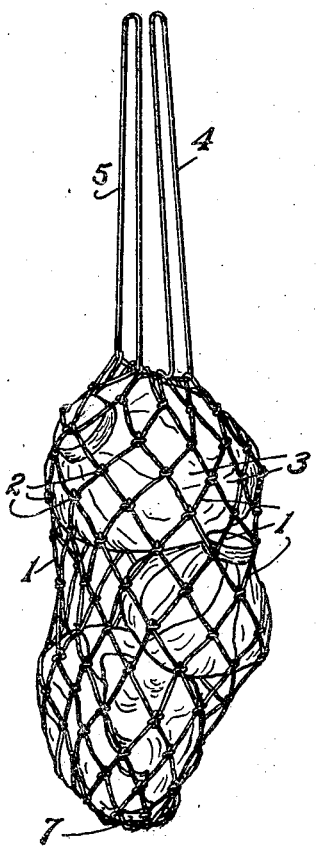
Figure 2:
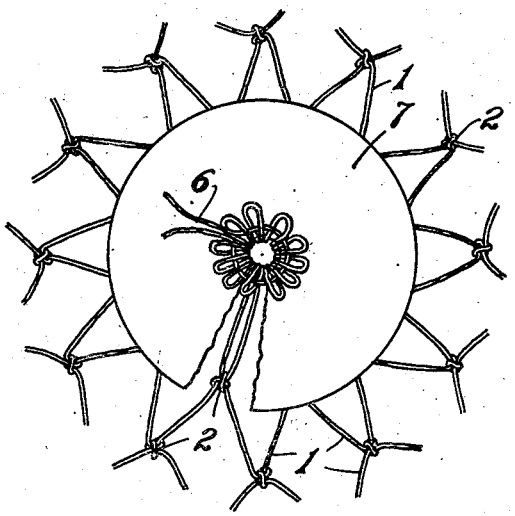
Figure 3:
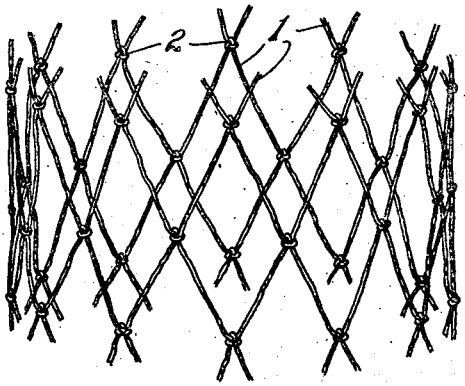

Throughout the specification and drawings like reference numerals are employed to indicate corresponding parts, and in the drawings Figure 1 is a view of my feeder filled and in condition for use, Fig. 2 is a fragmentary view showing the bottom supporting disk, and Fig. 3 is a diagrammatic view of my cylindrical mesh.

My device consists of a reticulated tubular body made up of strands 1 knotted at their intersections 2 and providing interstices 3 through which access may be had to the food within. This net work is preferably made of cord or twine which will not cut into the fiber of the vegetable to bruise the same. The receptacle is drawn together by strings 4 and 5 which also serve to support it in a hanging position, in which position it can not be roosted upon, but will be easily available for the fowl to pick at, which is the desirable manner in which such food should be administered.

My device is preferably constructed by forming a tubular mesh as indicated in Fig. 3. One end of this mesh is then gathered by the runner 6 and the ends of the meshes forming the edge of the article are drawn through the central aperture of the disk 7. The mesh is then turned inside out, leaving the disk 7 within the bag thus formed. The runner 6 is then knotted so that the ends can not be withdrawn back through the disk. The disk 7 therefore constitutes both a platform bottom for the feeder and a holder and spreader for the mesh. The cords 4 and 5 are then run in the upper end of the bag so that it may be drawn together or pulled open as desired. The size of the disk 7 may be varied in accordance with the nature of the food to be contained within the bag and the amount of spread found desirable.

Various other modifications may obviously be made in the form and construction of my invention, all without departing from the spirit of my invention if within the limits of the appended claims.

What I therefore claim and desire to secure by Letters Patent is:

1. A green food feeder for poultry and the like comprising a tubular reticulated containing member of flexible material, a spreader member within said container at the bottom thereof and having an aperture therein, the marginal meshes of one end of said container passing through said aperture and fastened on the opposite side of said spreader member.

2. A green food feeder for poultry and the like comprising a substantially cylindrical tubular reticulated containing member of flexible material, a spreader disk within said container at the bottom thereof and having a central aperture therein, the marginal meshes of one end of said container passing through said aperture and fastened on the opposite side of said spreader member, and gathering members run in the top mesh in the opposite end of said container.

In testimony whereof I affix my signature in presence of two witnesses.

WILLIAM D. MOODY.

Witnesses:
 A. P. CARTER,
 MINERVA B. GAMMAN.